United States Patent Office 3,307,630
Patented Mar. 7, 1967

3,307,630
ACIDIZING OIL FORMATIONS
Richard E. Dilgren and Frank M. Newman, Houston, Tex., assignors to Shell Oil Company, New York, N.Y., a corporation of Delaware
No Drawing. Filed June 12, 1964, Ser. No. 374,829
8 Claims. (Cl. 166—38)

The present invention relates to the treatment of subterranean formations penetrated by well bores, and pertains more particularly to methods for the treatment of such formations with acid to effect an increase in permeability.

Acidization of earth formation, particularly calcareous earth formations, has been practiced for some time for the purpose of increasing their permeability to the flow of fluids. In the usual well acidizing operations, a hydrochloric acid solution is pumped through the well and injected into the adjacent subterranean formation. However, such an acidization has the disadvantage of producing a poor distribution of permeability increases, because the acid is largely consumed in reactions with materials immediately adjacent to the well bore before the acid has penetrated beyond the immediate vicinity of the well. Numerous retarded acids and retarded-rate acidization procedures have been tried in an attempt to overcome this disadvantage.

The main purpose of controlling the rate of acidization is to improve the distribution of the permeability increases in the reservoir formation. The rate of acidization can be controlled by adjusting the rate at which acid is formed within a formation treating liquid that is injected into the formation. The rate is preferably adjusted to cause at least the major portion of the acid to be generated at a rate such that when the liquid in which the acid is forming moves into the earth formation, the greatest amount of rock is dissolved by the acid close to the borehole, to produce a corresponding increase in the permeability of the formation in this region; but, as the liquid continues to move deeper into the formation, more of the acid is generated at greater radial distances from the borehole, to cause some, but continually diminishing, increases in the permeability of the formation. An acidization that is controlled in this manner provides a permeability profile in which the greatest permeability increase is close to the well and the permeability increase gradually diminishes with increases in the radial distance away from the well.

Copending patent applications Serial No. 260,319, filed February 21, 1963, and which matured as U.S. Patent 3,215,199 on November 2, 1965, by R. E. Dilgren and Serial No. 362,482, filed April 24, 1964, by R. E. Dilgren describe acidization compositions and procedures that provide desirable permeability profiles in numerous reservoir formations. The first of these copending patent applications describes formation treating liquids comprising solutions of organic halides in solvating mediums in which the organic halides form hydrogen halides at rates that are slow at the surface temperature but are desirably rapid at the temperature of the formation into which they are injected. The second of these copending patent applications describes such solutions containing solvolysis reaction catalysts in concentrations such that the acids are produced at rates that are suitably rapid although the same organic halides would react too slowly in the absence of the catalysts.

While the compositions and procedures described in the above copending patent applications are suitable for many well treatment situations, they exhibit a disadvantage in respect to the treatment of certain reservoir formations. For example, where it is desirable that the formation treating liquid produce a relatively high concentration of hydrochloric acid, e.g., more than 10 percent by weight per unit volume, in a relatively short time in a relatively cool formation, e.g., at a temperature of less than about 200° F., it is difficult to formulate a solution of organic halide in a solvating medium which, with or without a solvolysis reaction catalyst, will meet such specifications. In respect to formation treating liquid formulations which economically attractive, water is the most rapidly reactive solvating medium that is presently available. But, the organic halides are immiscible in water and are miscible in, e.g., alcohols (which are also solvating mediums but are significantly slower reacting than water) containing only limited proportions of water. The injection of separate portions of liquids that each contain reactive components that are to be mixed and reacted within a reservoir formation has proven to be a generally unfeasible type of well treatment procedure.

A primary object of the present invention is to provide a process of acidizing a well by injecting, into the formation to be treated, a substantially homogeneous liquid mixture of reactants that react to produce a strong acid at a rate such that the permeability of the formation is significantly increased and is increased by amounts that decrease with distance away from the well in an optimum pattern to improve the productivity of the well. The term "substantially homogeneous liquid mixture" is used herein to refer to a liquid which is homogeneous in the sense that any pair of aliquot, macroscopic samples of the liquid have substantially the same composition.

A further object of the present invention is to provide a method of incorporating an organic halid into a substantially homogeneous liquid mixture of solvolysis reactants in a manner such that the organic halide reacts to produce a strong acid at a rate that materially exceeds the rate at which it would produce a similar concentration of strong acid when the liquid mixture of solvolysis reactants comprise an aqueous alcohol solution of the organic halide.

These and other objects of the present invention will be understood from the following description of the present invention.

Briefly, the present invention provides a method of treating a subterranean formation penetrated by a well bore to increase the permeability of the formation by emulsifying a mixture of an organic halide and water with an emulsifying agent to form an emulsion that is temporarily stable under conditions existing at the subterranean formation, being stable until the organic halide of the emulsion is hydrolyzed, subsequently pumping the emulsified mixture of the organic halide and water down the well, while the organic halide is hydrolyzing at rates that increase with increases in temperature, and in injecting the mixture of the hydrolyzing organic halide into the subterranean formation at a rate such that the major portion of the reaction product, hydrogen halide, is formed within the formation. The hydrolyzing mixture is maintained in the formation for a time sufficient for the reaction product, hydrogen halide, to react with and dissolve a portion of the formation to increase the permeability thereof.

Tests proved that acid reaction rates 3 to 4 times faster were obtainable with much higher acid yields (25% versus 15%) when an organic halide was emulsified in water with an emulsifying agent as compared to employing the same organic halide with the best aqueous solution of a solvating agent.

The organic halide can be substantially any liquid or liquifiable organic halide that contains hydrolyzable halogen atoms. Mixtures of organic halides can be used and each one of the mixture of the organic halides hydrolyzes at its individual rate independent of the other organic halides in the mixture.

The water employed in forming the emulsions of the present invention can contain any solute which is substantially inert in respect to the hydrolysis reaction and halogen halide. Particularly, in using rapidly reactive systems in relatively high temperature wells, it may be desirable to dissolve or suspend a corrosion inhibitor in the mixture of water and organic halide. Suitable inhibitors comprise the $C_5$ to $C_{12}$ propargyl alcohols, the soluble metal arsenites, and the like inhibitors. Water comprises a particularly suitable solvolysis medium for producing concentrated acid solutions because of its low cost and low molecular weight.

The emulsifying agent can be any which is sufficiently stable and temperature stable to maintain emulsification and/or solubilization without agitation at the temperature of the earth formation to be treated. These emulsions can be either water-in-oil or oil-in-water emulsions. In general, any emulsifying agent which passes the simple test of maintaining emulsification for a significant period, say as much as 30 minutes, without agitation, is suitable for use by the process of the present invention. Several commercial emulsifiers which may be employed are Triton GR–7, Triton X–151, Polytergent J–200, Ethomid C/15 and Ethomid HT/60. Triton GR–7 is dioctyl sodium sulfosuccinate manufactured by Rohm and Haas; Triton X–151 is a blend of alkyl aryl polyether alcohols with organic sulfonates manufactured by Rohm and Haas; Polytergent J–200, manufactured by Mathieson Chemical Co., is polyethoxylated tridecyl alcohols. Ethamod C/15 and Ethomid HT/60, manufactured by Armour, are ethylene oxide condensation products of fatty acid amides. The emulsifier Triton GR–7 (essentially dioctyl sodium sulfosuccinate) is exceptionally suitable in that when present in concentrations as low as 5% by weight of the system, it completely solubilizes or forms a stable emulsion between the organic halide and the water of the system.

The concentration in which the hydrogen halide is produced by the hydrolysis reaction can be substantially any selected concentration up to the stoichiometric equivalent of the reactants. The use of concentrations of the reactants which would form less than 1% by weight of acid would have little significant effect on dissolving sufficient of the earth formation to change its permeability.

In one of its more specific embodiments, the method of the present invention comprises introducing into a formation to be acidized a liquid mixture (which term includes within its definition a solution) comprising, containing, or consisting of an aliphatic monochloride and water plus an emulsifying agent or surfactant in amounts to produce within the formation, by hydrolysis, sufficient hydrogen chloride to increase substantially the productivity of the subterranean formation by acidization by said inorganic acid, and maintaining said introduced mixture or solution in the formation for a time sufficient to effect at the formation temperature, said interaction between the aliphatic monochloride and the water to convert all of the organic chloride, thereby producing sufficient hydrogen chloride for said acidization.

An advantage of using the process of the present invention, i.e., a process in which a single substantially homogeneous liquid is injected into the formation, resides in the ability of selecting the proper or suitable organic halide which when emulsified in water reacts in the formation to be treated (i.e., at the particular formation temperature) to convert all of the organic halide to produce the desired active acid (i.e., hydrogen halide acid).

Both the total amount of the two reactants, i.e., the organic halide and the solvating medium, as well as the ratio of one to the other may vary within rather wide limits. In acidizing a subterranean formation, it is generally preferable to employ a ratio of the reactants in which there is a stoichiometric excess of the water solvating medium. In so acidizing a formation, the hydrogen halide formed reacts with carbonate components of the formation substantially as soon as the hydrogen halide is formed. The reaction between the organic halide and the water solvating medium proceeds to completion and produces an amount of hydrogen halide equivalent to the amount of the organic halide which was used.

Another reason for not using a mixture or solution having a stoichiometric excess of the organic halide is that it is normally highly undesirable to produce a crude oil containing even minute quantities of organic halide. The reason for this is that this organic halide normally adversely affects the catalyst used in the platformer unit. The organic halide and the water and emulsifying agent can be selected and proportioned to yield solvolysis reaction products equivalent to acidizing solutions ranging from relatively dilute solutions, e.g., containing less than about 5 percent by weight of acid per volume of liquid, to relatively concentrated acidizing solutions, e.g., solutions in which the acid concentration is about 25 percent or more. In acidizing a subterranean formation by the process of the present invention, the reactants are preferably employed in a ratio productive of a solvolysis reaction product equivalent to a solution containing at least one percent hydrogen halide so as to be able to dissolve a significant portion of the formation. In practice, such a concentration is never actually attained because the hydrogen halide is spent in the acidization reaction substantially as fast as the acid is formed.

Although various organic halides may be used as one of the reactants which, according to the invention, will form in situ the desired inorganic acid, it is preferable to employ aliphatic halides which may be either saturated or unsaturated provided they form by solvolysis the desired inorganic halide. A preferred class of these aliphatic halides are the saturated monohalides and the unsaturated non-vinyl monohalides. Illustrative examples of these compounds are n-propyl chloride, isopropyl chloride, t-butyl chloride, allyl chloride, crotyl chloride, methyl vinyl carbinyl chloride, as well as the corresponding bromides and iodides, e.g., allyl bromide, allyl iodide, t-butyl bromide, and t-butyl iodide. The organic halide used as a reactant in the present process can be one containing functional groups other than halogen atoms. Examples of suitable polyfunctional organic halides include ethers such as bis-betachloroisopropyl ether, and cyclic ethers such as epichlorohydrin. Organic fluorides are generally less suitable as reactants in the present process because of their tendency to form insoluble calcium fluorides, but the organic fluorides can be used whenever it is desirable to contact a calcium-free formation with a mixture of hydrogen fluoride and an oil-miscible solvent.

The various alkyl halides are generally oil soluble and only very slightly soluble in water. Depending on the formation temperature and assuming that water and an emulsifier is used, one may prefer to use one or another of the various organic halides. Thus, it is known that the temperature in an oil well and also in the subterranean formations surrounding it and into wihch it is desired to introduce the agents which form the inorganic acid in situ, may vary from a low temperature in the neighborhood of 100° F. or below to temperatures as high as 450° F. and even higher. In order to effect the solvolysis at a desired rate in the formation rather than prematurely in the well, it is frequently preferred (if not essential) to use an organic halide which is substantially inert or slowly reactive in respect to the production of hydrogen halide at the temperatures existing at the surface and in the upper portion of the well. Thus, in formations which are very hot, e.g., those having a temperature of about 350° F. or higher, it is well to consider using isopropyl chloride which is relatively slow in solvolysis reactions. In formations having a temperature of about 190–350° F., satisfactory results have been obtained by the use of allyl chloride while in cooler wells one may use crotyl chloride and its isomer, while t-butyl chloride, which is the most reactive of the above-mentioned chlorides, woud be suitable for use in quite cool formations.

It has been stated that it is preferred to use alkyl monohalides. However, organic compounds having more than one halogen may also be used providing both will react under the operating conditions or providing that such compounds are used in situations in which no organic halide becomes dissolved in the oil recovered from the formation since otherwise the organic halide presence may be detrimental during the further treatment of the recovered oil.

The invention will be further illustrated by reference to the following examples which are not to be considered as limiting:

*Example of emulsified, non-catalyzed system (allyl chloride)*

An oil well which produces from a dolomite formation and has a reservoir temperature of 283° F. is acidized with the present process by injecting an acid-producing emulsion which generates hydrochloric acid at reservoir temperature as indicated by the following table:

| Time: | Percent, HCl produced |
|---|---|
| 10 min. | 7.38 |
| 20 min. | 9.01 |
| 40 min. | 12.5 |
| 60 min. | 13.3 |
| 24 hr. | 15.0 |

This acidizing emulsion is formed by mixing 4000 lb. of surfactant, Triton GR-7, and 325 lb. of inhibitor, Dowell A-109 (a propargyl alcohol), in 34,000 lb. of allyl chloride. The mixture is blended with 8400 gal. water to give 13,300 gal. of emulsion capable of reaction within the reservoir to give 13,300 gal. of a mixture containing 15% w./v. hydrochloric acid. After pumping the acidizing emulsion through the tubing string and into the reservoir, lease crude is pumped in to displace the acid-producing emulsion out of the tubing. The well was then shut in to allow the acid to compeltely form and to react within the reservoir. At the end of 24 hours the well was allowed to flow and an analysis of the spent acidizing system demonstrated that all of the allyl chloride had reacted. The treatment resulted in a production rate substantially better (40%) than that (0%) obtained by conventional treatments.

*Example of emulsified, non-catalyzed system (t-butyl chloride)*

An oil well which produces from a limestone formation and has a reservoir temperature of 150° F. is acidized with the present process by injecting an acid producing emulsion which generates hydrochloric acid at reservoir temperature as shown in the following table:

| Time: | Percent, HCl produced |
|---|---|
| 10 min. | 8.49 |
| 20 min. | 11.16 |
| 50 min. | 16.36 |
| 100 min. | 17.80 |
| 200 min. | 18.73 |
| 24 hr. | 20.00 |

This acidizing emulsion is comprised of 50.8% w. t-butyl chloride, 5.0% w. Ethomid HT-60, a surfactant, and 44.2% w. water; it is prepared by dissolving the ethomid HT-60 in the t-butyl chloride and then blending in the water. An emulsion is obtained which is capable of reaction within the reservoir to yield an equal volume of 20% w. hydrochloric acid. After pumping the acidizing emulsion through the tubing string and into the reservoir, lease crude is pumped in to displace the acid-producing emulsion out of the tubing. The well was then shut in to allow the acid to completely form and to react within the reservoir. At the end of 24 hours the spent acidizing emulsion was swabbed back and an analysis of the spent acidizing system demonstrated that all of the t-butyl chloride had reacted. The treatment by the present process resulted in a substantially better production rate than the obtained by conventional methods.

*Example of emulsified, catalyzed system (allyl chloride, cuprous chloride)*

An oil well which produces from a limestone formation and has a reservoir temperature of 195° F. is acidized with the present process by injecting an acid-producing emulsion which generates hydrochloric acid at reservoir temperature as shown in the following table:

| Time: | Percent, HCl produced |
|---|---|
| 5 min. | 10.3 |
| 15 min. | 12.4 |
| 30 min. | 14.5 |
| 60 min. | 16.5 |
| 24 hr. | 20.0 |

The emulsion is prepared by mixing water and allyl chloride solutions which are prepared as follows: Water solution—440 lb. of anhydrous ammonia and 440 lb. of anhydrous cupric chloride are dissolved in 5000 gal. of water. Allyl chloride solution—4000 lb. of Triton GR-7, surfactant, and 400 lb. of hydrazine are dissolved in 34,000 lb. of allyl chloride. When the allyl chloride and water solutions are mixed, 10,000 gal. of an emulsion is obtained which is capable of reaction within the reservoir to yield 10,000 gal. of 20% w./v. hydrochloric acid. After pumping the acidizing emulsion through the tubing string and into the reservoir, lease crude is pumped in to displace the acid-producing emulsion out of the tubing. The well was then shut in to allow the acid to completely form and to react within the reservoir. At the end of 24 hours the spent acidizing emulsion was swabbed back and an analysis of the spent acidizing system showed that all of the allyl chloride had reacted. Before this treatment, the well pumped 35 bbl. oil/day; after this treatment, the well initially produced at 170 bbl. oil/day and then finally stabilized at 60 bbl. oil/day, a 71% improvement.

As pointed out hereinabove, the rate at which acid is generated in a well or in the formation adjacent the well, can be controlled to some extent by selection of the proper organic halide to be combined with the desired amount of water and an emulsifying agent depending upon the temperature conditions under which the mixture is to be employed. In addition to controlling the rate at which acid is produced by the above method, it has also been found to be advantageous at times to employ a catalyst capable of speeding up the conversion of the organic halide into acid. Thus, the use of minute amounts of a suitable catalyst to the reactions given in the examples hereinabove is capable of speeding up the reactions by several orders of magnitude.

It is well known that where a well is drilled into an oil-bearing formation, say one well for each 40 acres, there is a pressure drop existing in the formation as all the oil from the 40 acres attempts to drain into say a 6 inch well borehole. The pressure drop from a formation into a well is measurable and may be calculated and plotted as a curve by methods well known to the art. In order to obtain the greatest production of oil from the well, it is desirable to acidize the well by the method of the present invention with the reaction mixture and the catalyst being selected in a manner so as to generate acid at a rate such as to dissolve portions of the formation adjacent the well so that an increase in formation permeability with distance from the well is achieved which is preferably qualitatively the mirror image of the decrease in pressure drop from the formation to the well. By having the acid dissolve the greatest amount of rock near the well, the flow channels so generated are of a size to handle the combined flow of fluid coming from all directions of the 40 acre field.

It has been found that a particularly good catalyst for use in catalyzing the hydrolysis of the organic halide of the present invention, for example, allyl chloride, comprises a water-soluble compound containing cuprous ions, such as cuprous chloride or cuprous nitrate. In general, the catalyst may comprise any of the solvolysis reaction catalysts that are compatible with the components of a liquid containing an organic halide, a solvating medium and the acid soluble compounds of a subsurface earth formation. The capability of cuprous ions to act as a catalyst under conditions existing in a carbonate reservoir was demonstrated by the addition of 0.2% cuprous chloride in aqueous solution to a mixture containing 42% by weight allyl chloride, 14% by weight water and 44% by weight isopropyl alcohol. A substantial enhancement of the rate of acid formation was observed. De-aerated water was used in preparing the acidizing solutions so as to minimize deactivation by air-oxidation of the catalyst ions to the noncatalytic cupric ions. With the reaction taking place at 91° C. (the bottom hole temperature encountered in wells in the Virginia Hills Field and the Cedar Creek Anticline) the use of 42% by weight of allyl chloride with or without the cuprous ion catalyst was capable of yielding 20% by weight of hydrochloric acid. The mixture without the catalyst present yielded only 1% of hydrochloric acid in 300 minutes and 3% in 1350 minutes. On the other hand in the presence of 0.2% w. cuprous chloride, the mixture yielded at 5% of hydrochloric acid in 100 minutes and 10% in 750 minutes. From 0.01 to 2.0% or more of a material containing cuprous ions may be employed.

Since the cuprous ions of the catalyst are readily oxidized to the non-catalytic cupric ion state by oxygen in the air, in the event that the water being used in carrying out the method of the present invention contains dissolved oxygen, it is preferable to also add a reducing agent to the mixture to prevent deactivation of any of the cuprous ions; which would result in decrease in rate of reaction for acid formation in the well or adjacent formation. One of the best materials found for use with the method of the present invention is hydrazine. The hydrazine not only acts as a oxygen scavenger in the water but is also capable of reducing the noncatalytic cupric ions to catalytic cuprous ions. This reduction is extremely slow in an acid medium, better at neutral conditions, and instantaneous in an alkaline medium. Ammonia or other water-soluble alkaline materials may be added to maintain the mixture alkaline at the beginning of the reaction.

We claim as our invention:

1. A method of treating a subterranean formation penetrated by a well bore to increase the permeability of said formation, said method comprising emulsifying a mixture of an organic halide and water with an emulsifying agent to form an emulsion stable under conditions existing at said subterranean formation, in which emulsion the organic halide is mixed with a stoichiometric excess of water and is substantially completely hydrolyzed, pumping said emulsified mixture of organic halide and water down said well as the organic halide starts to hydrolyze, injecting said emulsified mixture of organic halide and water into said subterranean formation in a radially extensive zone around the well at a rate such that the major portion of the reaction product hydrogen halide formed by said hydrolyzing organic halide is formed within said formation and a greater portion of the hydrogen halide is formed in the vicinity of the well with a lesser portion of said hydrogen halide being formed at radially extensive distances from said well, and maintaining said injected mixture in said formation for a time sufficient for the reaction product hydrogen halide to react with and dissolve a portion of said formation to increase the permeability thereof.

2. The method of claim 1 wherein the organic halide is an aliphatic monohalide.

3. The method of claim 1 including the step of controlling the rate at which said organic halide is hydrolyzed by the addition of a catalyst to said mixture.

4. The method of claim 3 wherein said catalyst is a material containing cuprous ions.

5. The method of claim 1 including the addition to said emulsified mixture a corrosion inhibitor stable under well conditions and in an amount sufficient to prevent corrosion of well equipment until said mixture is injected into said formation.

6. The method of claim 4 including the step of admixing into said emulsified mixture a source of cupric ions and a reducing agent in an amount sufficient to reduce $Cu^{++}$ to $Cu^+$ and further prevent oxidation of said produced cuprous ions.

7. The method of claim 6 in which the reducing agent is hydrazine in an alkaline environment.

8. The methodd of claim 6 including the step of admixing into said emulsified mixture an alkaline material in an amount sufficient to provide a pH of 8 prior to any substantial hydrolyzing of said organic halide.

References Cited by the Examiner

UNITED STATES PATENTS

| | | | |
|---|---|---|---|
| 1,999,146 | 4/1935 | Ambrose et al. | 166—42 |
| 2,059,459 | 11/1936 | Hund et al. | 166—38 |
| 2,343,136 | 2/1944 | Dobson et al. | 166—44 |
| 3,215,199 | 11/1965 | Dilgren | 166—38 |

CHARLES E. O'CONNELL, *Primary Examiner.*

S. J. NOVOSAD, *Assistant Examiner.*